US011949837B2

(12) United States Patent
Kobayashi et al.

(10) Patent No.: US 11,949,837 B2
(45) Date of Patent: Apr. 2, 2024

(54) MANAGEMENT APPARATUS AND IMAGE READING SYSTEM

(71) Applicant: SEIKO EPSON CORPORATION, Tokyo (JP)

(72) Inventors: Daiki Kobayashi, Shiojiri (JP); Kazuma Seki, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 9 days.

(21) Appl. No.: 17/935,643

(22) Filed: Sep. 27, 2022

(65) Prior Publication Data

US 2023/0114634 A1 Apr. 13, 2023

(30) Foreign Application Priority Data

Sep. 27, 2021 (JP) ................................ 2021-156606

(51) Int. Cl.
*H04N 1/32* (2006.01)
*G06F 21/31* (2013.01)

(52) U.S. Cl.
CPC ........... *H04N 1/3239* (2013.01); *G06F 21/31* (2013.01); *H04N 1/32117* (2013.01)

(58) Field of Classification Search
None
See application file for complete search history.

(56) References Cited

U.S. PATENT DOCUMENTS

| | | | | |
|---|---|---|---|---|
| 8,489,771 B2* | 7/2013 | Sawayanagi | ....... | H04N 1/00217 709/248 |
| 9,836,516 B2* | 12/2017 | Quakkelaar | ............. | G06F 16/27 |
| 10,412,109 B2* | 9/2019 | Loureiro | ............... | G06F 21/577 |
| 2007/0081399 A1* | 4/2007 | Kishimoto | .............. | G06F 21/10 365/189.05 |
| 2015/0193673 A1* | 7/2015 | Park | ...................... | G06F 3/1213 358/1.15 |
| 2018/0091470 A1* | 3/2018 | Terao | .................. | H04L 41/0893 |

FOREIGN PATENT DOCUMENTS

JP 2019050530 A 3/2019

* cited by examiner

*Primary Examiner* — Miya J Cato
(74) *Attorney, Agent, or Firm* — CHIP LAW GROUP

(57) ABSTRACT

A management apparatus that realizes transmission of scanned data, which is generated by each of a plurality of image readers including a first image reader and a second image reader, in accordance with address information associated with the image reader, the management apparatus including a storage that stores a plurality of pieces of address information including first address information associated with the first image reader and second address information associated with the second image reader, a receiver configured to receive a duplication instruction that duplicates the first address information as the second address information, and a setting section that causes the storage to store the first address information stored in the storage as the second address information in accordance with the duplication instruction.

8 Claims, 9 Drawing Sheets

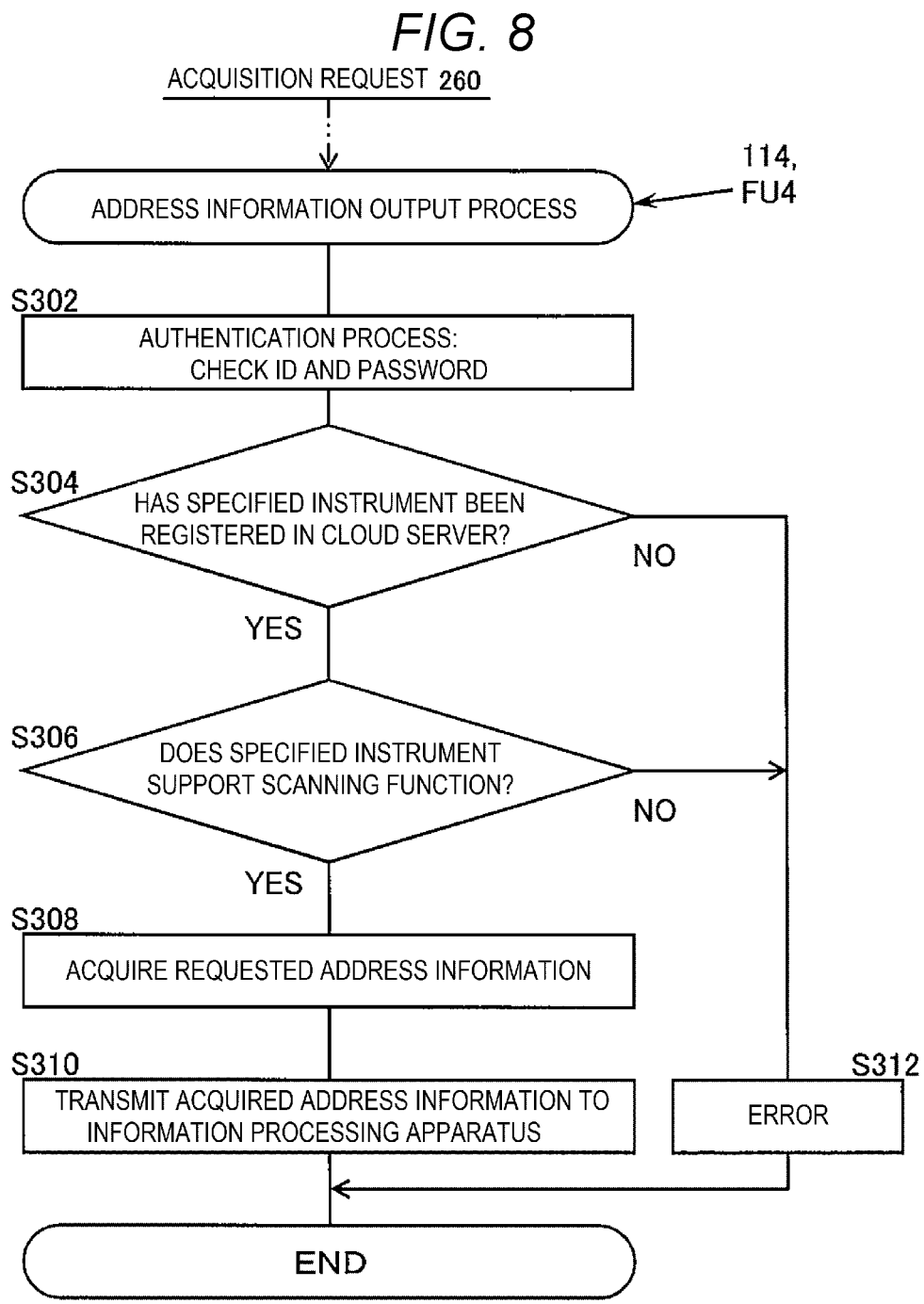

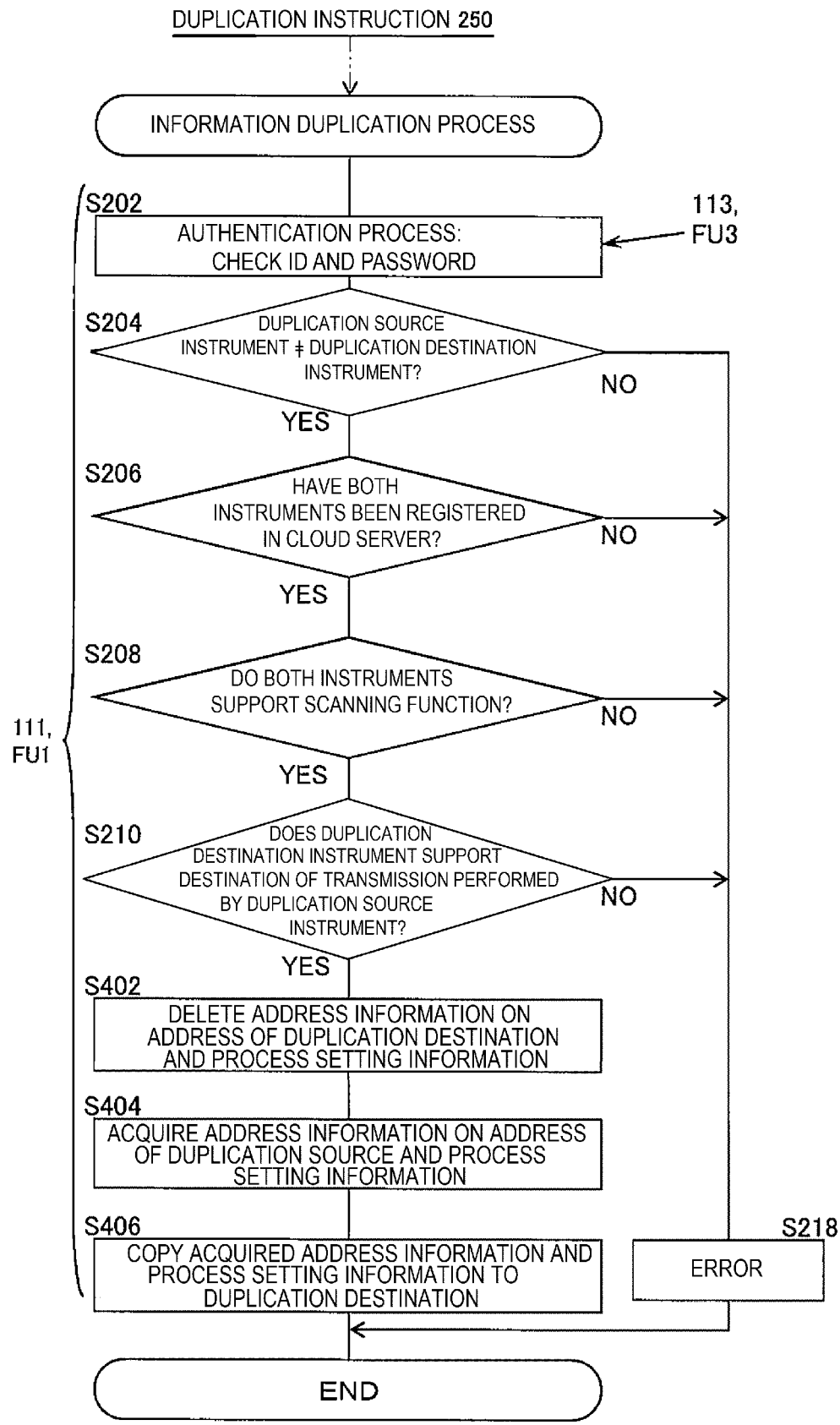

MANAGEMENT APPARATUS AND IMAGE READING SYSTEM

The present application is based on, and claims priority from JP Application Serial Number 2021-156606, filed Sep. 27, 2021, the disclosure of which is hereby incorporated by reference herein in its entirety.

BACKGROUND

1. Technical Field

The present disclosure relates to a management apparatus that realizes transmission of scanned data generated by an image reader in accordance with address information, and to an image reading system including the management apparatus.

2. Related Art

A cloud storage has been increasingly used as a destination of transmission of scanned data generated by an image reader such as a multifunction machine, a document scanner, and a printer having a scanning function. JP-A-2019-50530 describes that scanned data is saved to a cloud storage by specifying a cloud service as the destination where data scanned by a multifunction machine is saved.

When a user who manages a plurality of image readers registers a plurality of cloud storages as the destination of transmission of scanned data with respect to the plurality of image readers, the registration process may be time-consuming, or registration omission may occur.

The problems described above are not limited in the case where the destination of transmission of scanned data is a cloud storage and may also occur in a case where the destination is an e-mail.

SUMMARY

A management apparatus according to an aspect of the present disclosure is a management apparatus that realizes transmission of scanned data, which is generated by each of a plurality of image readers including a first image reader and a second image reader, in accordance with address information associated with the image reader, the management apparatus including a storage section that stores a plurality of pieces of address information including first address information associated with the first image reader and second address information associated with the second image reader, a receiver configured to receive a duplication instruction that duplicates the first address information as the second address information, and a setting section that causes the storage section to store the first address information stored in the storage section as the second address information in accordance with the duplication instruction.

An image reading system according to another aspect of the present disclosure is an image reading system including a plurality of image readers including a first image reader and a second image reader, a management apparatus that realizes transmission of scanned data, which is generated by each of the plurality of image readers, in accordance with address information associated with the image reader, and an information processing apparatus configured to transmit a registration instruction that instructs the management apparatus to store the plurality of pieces of address information, the management apparatus including a storage section that stores the plurality of pieces of address information, which includes first address information associated with the first image reader and second address information associated with the second image reader, the information processing apparatus configured to transmit a duplication instruction that duplicates the first address information as the second address information to the management apparatus, and the management apparatus including a receiver configured to receive the duplication instruction, and a setting section that causes the storage section to store the first address information stored in the storage section as the second address information in accordance with the duplication instruction.

BRIEF DESCRIPTION OF THE DRAWINGS

FIG. 8 is a flowchart diagrammatically showing an example of an address information output process carried out by the management apparatus.

FIG. 9 is a flowchart diagrammatically showing an example of an information duplication process carried out by the management apparatus.

DESCRIPTION OF EXEMPLARY EMBODIMENTS

Figure 1:
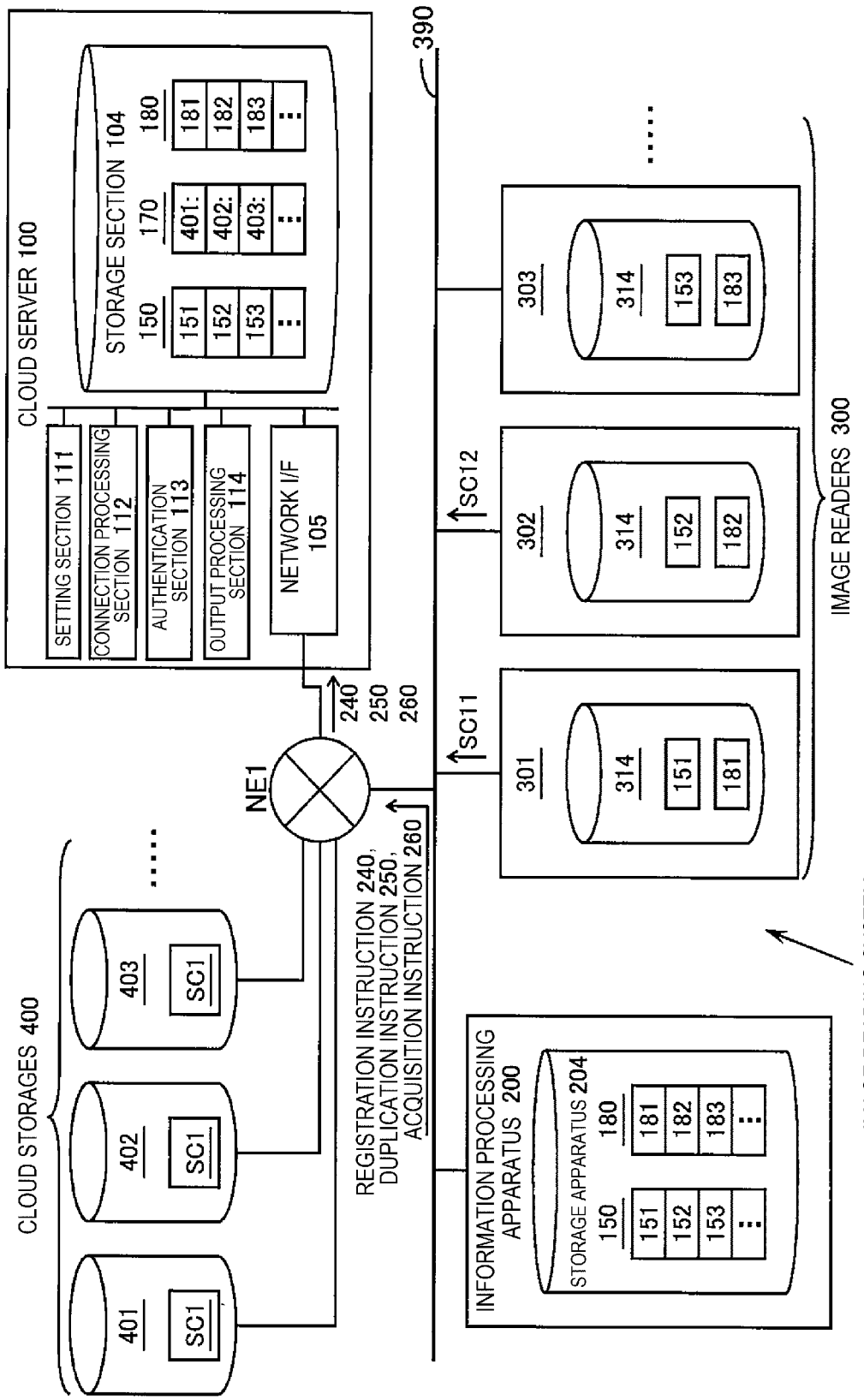
FIG. 1 diagrammatically shows an example of an image reading system along with cloud storages.

An embodiment of the present disclosure will be described below. The following embodiment, of course, merely demonstrates the present disclosure, and all the features shown in the embodiment are not necessarily essential to the solution of the present disclosure.

(1) Overview of Technology Included in Present Disclosure:

An overview of the technology included in the present disclosure will first be described with reference to the example shown in FIGS. 1 to 9. The figures in the present application schematically show an example, and the magnification factor in each direction shown in the figures varies in some cases, and the figures may not be consistent with one another in terms of magnification factor. Each element in the present technology is, of course, not limited to the specific example labeled with the reference character. In "Overview of technology included in present disclosure", parentheses mean a supplementary description of the word immediately before the parentheses.

Figure 2:
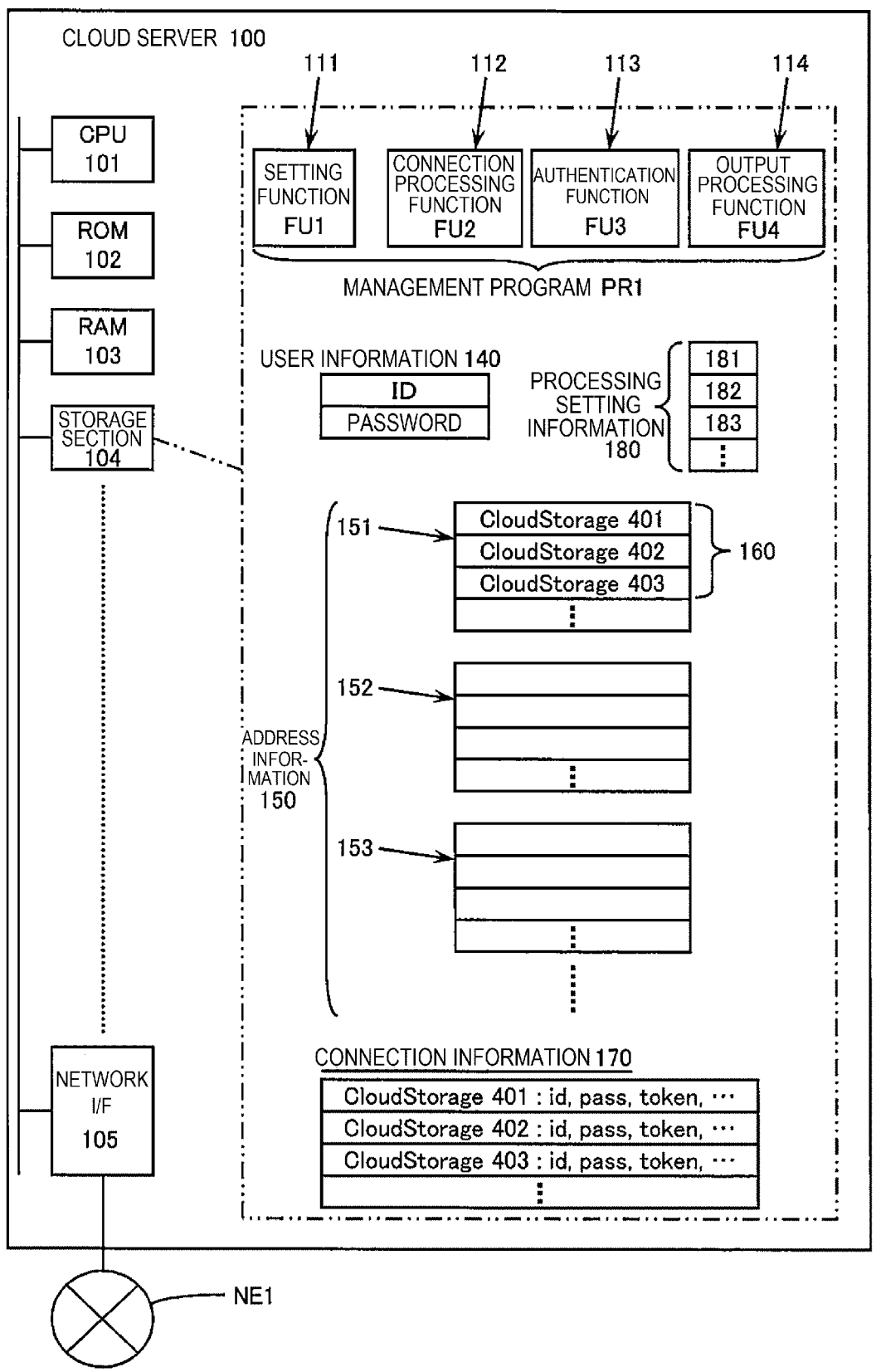
FIG. 2 is a block diagram diagrammatically showing an example of the configuration of a management apparatus.

First Aspect:

A management apparatus (cloud server 100, for example) according to an aspect of the present technology is a management apparatus (100), which realizes transmission of scanned data SC1 generated by each of a plurality of image readers 300 including a first image reader 301 and a second image reader 302 in accordance with address information associated with the image reader 300 out of a plurality of pieces of address information 150, and the management apparatus (100) includes a storage section 104, a receiver (network I/F 105, for example), and a setting section 111, as shown in FIGS. 1 and 2 and other figures. Note that I/F is an abbreviation for interface. The storage section 104 stores the plurality of pieces of address information 150, which includes first address information 151 associated with the first image reader 301 and second address information 152 associated with the second image reader 302. The receiver (105) can receive a duplication instruction 250 for duplication of the first address information 151 as the second address information 152. The setting section 111 causes the storage section 104 to store the first address information 151, which is stored in the storage section 104, as the second address information 152 in accordance with the duplication instruction 250.

It is assumed that scanned data generated by the first image reader 301 is called scanned data SC11, and that scanned data generated by the second image reader 302 is called scanned data SC12, as shown in FIG. 1 by way of example. The scanned data SC1 described above collectively refers to the scanned data SC11 and the scanned data SC12.

After the duplication instruction 250 for duplication of the first address information 151 as the second address information 152 is received by the receiver (105), the first address information 151 stored in the storage section 104 is stored as the second address information 152 in the storage section 104 in accordance with the duplication instruction. Therefore, when the destination of transmission of the scanned data SC12 generated by the second image reader 302 is caused to coincide with the destination of transmission of the scanned data SC11 generated by the first image reader 301, it is no longer necessary to re-set the destination of the scanned data SC12 transmitted from the second image reader 302. The first aspect described above can therefore provide a management apparatus (100) capable of efficiently setting the destination of the scanned data SC1 transmitted from the plurality of image readers 300.

Note that the transmission of the scanned data SC1 generated by the image readers 300 in accordance with the address information 150 may be performed by the management apparatus (100) or an apparatus different from the management apparatus (100) (image readers 300 or information processing apparatus 200, for example).

The plurality of image readers 300 may include image readers different from the first image reader 301 and the second image reader 302. The plurality of pieces of address information 150 may therefore contain address information different from the first address information 151 and the second address information 152.

The terms "first", "second", in the present application are those for identifying corresponding ones of a plurality of components similar to one another and do not imply the order of the components. The correspondence between the plurality of components and the terms "first", "second", . . . is determined in a relative manner.

The notes described above are also applied to the following aspects.

Second Aspect:

The first address information 151 may contain cloud storage address information 160 representing that any of cloud storages 400 connected to the management apparatus (100) according to the present embodiment is the transmission destination, as shown in FIG. 2 and other figures by way of example. The storage section 104 may store connection information 170 necessary for connection from the management apparatus (100) according to the present embodiment to the cloud storages 400 separately from the plurality of pieces of address information 150. The setting section 111 may cause the storage section 104 to store the first address information 151 that does not contain the connection information 170 as the second address information 152 in accordance with the duplication instruction 250. The management apparatus (100) according to the present embodiment may further include a connection processing section 112, which establishes connection to the cloud storages 400 based on the connection information 170, to forward the scanned data SC12 generated by the second image reader 302 to any of the cloud storages 400.

In the second aspect described above, the management apparatus (100) establishes the connection to the cloud storages 400 based on the connection information 170 stored in the storage section 104 even when the address information 150 does not contain the connection information 170 necessary for the connection to the cloud storages 400, so that the scanned data SC1 generated by the image readers 300 are transmitted to the cloud storages 400. The second aspect described above can therefore provide a preferable example in which the destinations of the transmission of the scanned data SC1 are the cloud storages 400.

Third Aspect:

The first address information 151 may contain a plurality of pieces of cloud storage address information 160 representing that the plurality of cloud storages 400 connected to the management apparatus (100) are the transmission destinations, as shown in FIG. 2 and other figures by way of example. The setting section 111 may cause the storage section 104 to store the first address information 151 containing the plurality of pieces of cloud storage address information 160 as the second address information 152 in accordance with the duplication instruction 250. The present aspect can provide a preferable example in which the destinations of the transmission of the scanned data SC1 are the plurality of cloud storages 400.

Figure 6:
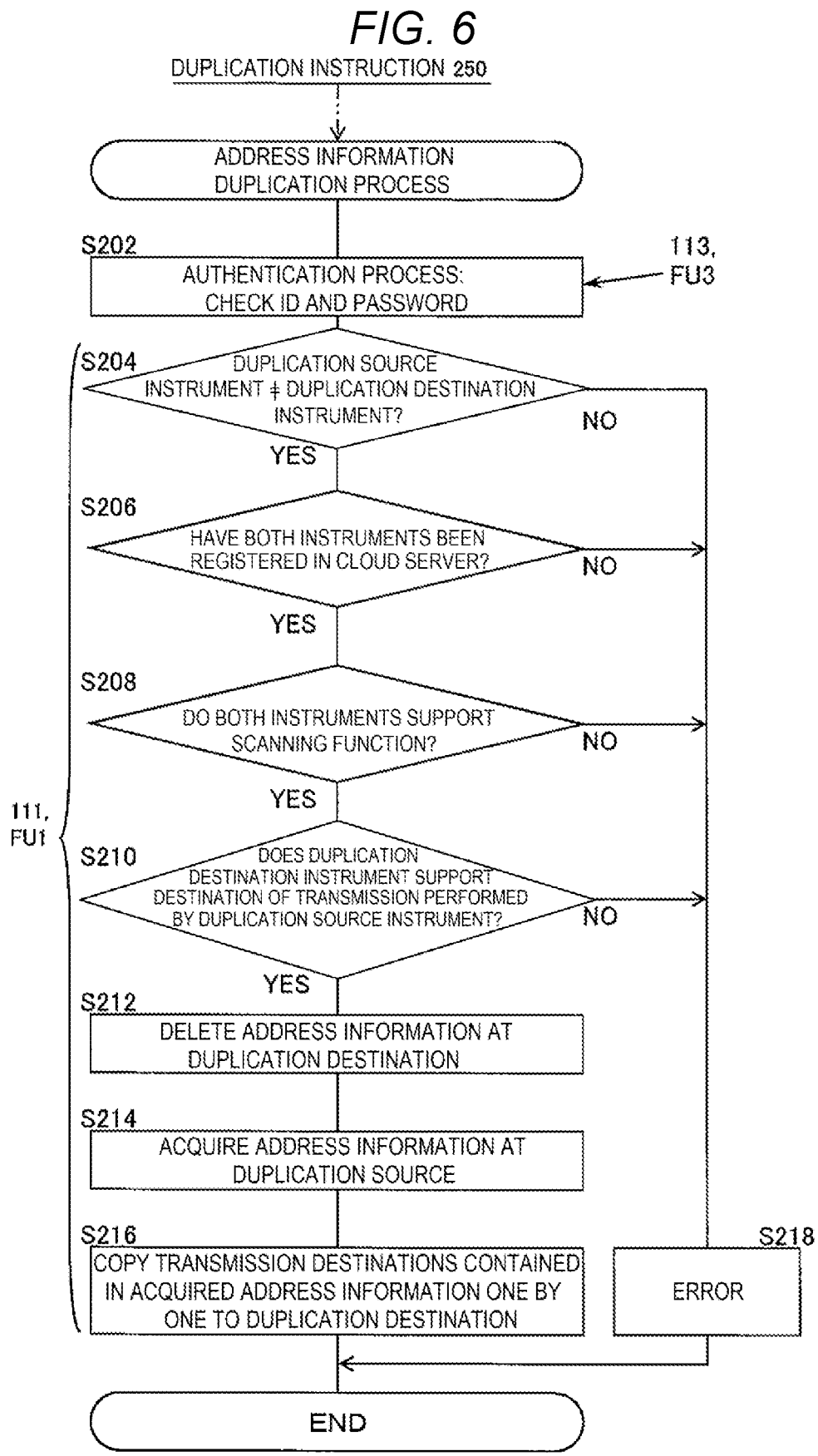
FIG. 6 is a flowchart diagrammatically showing an example of an address information duplication process carried out by the management apparatus.

Fourth Aspect:

The management apparatus (100) according to the present embodiment may further include an authentication section 113, which requests the information processing apparatus 200 to authenticate a user when the receiver (105) receives the duplication instruction 250 from the information processing apparatus 200, as shown in FIGS. 1 and 6 and other figures. The setting section 111 may cause the storage section 104 to store the first address information 151 stored in the storage section 104 as the second address information 152 when the authentication is accepted. The present aspect allows improvement in security of the management apparatus (100) because the first address information 151 is not duplicated even when an unauthorized user transmits the duplication instruction 250 to the management apparatus (100).

Fifth Aspect:

After the duplication instruction 250 is received with the second address information 152 stored in the storage section 104, the setting section 111 may delete the second address information 152 from the storage section 104, or may cause the storage section 104 to store the first address information 151 as the second address information 152 after deleting the second address information 152, as shown in FIG. 6 and other figures by way of example. The present aspect allows the storage section 104 to store the first address information 151 as the second address information 152 even when the second address information 152 is stored in a limited area, and can therefore provide a preferable example of efficient setting of the destinations of the scanned data SC1 transmitted from the plurality of image readers 300.

Sixth Aspect:

The receiver (105) may be capable of receiving from the information processing apparatus 200 an acquisition request 260 to acquire requested address information 150 out of the plurality of pieces of address information 150 stored in the storage section 104, as shown in FIG. 1 by way of example. The management apparatus (100) according to the present embodiment may further include an output processing section 114, which forwards the requested address information 150 to the information processing apparatus 200 when the acquisition request 260 is received. In the present aspect, the address information 150 requested in response to the acquisition request 260 is forwarded from the management apparatus (100) to the information processing apparatus 200, so that the address information 150 can be used for purposes other than setting the destinations of the scanned data SC1.

Seventh Aspect:

The storage section 104 may store first process setting information 181, which represents a setting in accordance with which the first image reader 301 carries out a process, and second process setting information 182, which represents a setting in accordance with which the second image reader 302 carries out a process, as shown in FIG. 2 and other figures by way of example. The setting section 111 may cause the storage section 104 to store the first process setting information 181 stored in the storage section 104 as the second process setting information 182 in accordance with the duplication instruction 250. In the present aspect, when the duplication instruction 250 is received by the receiver (105), the first process setting information 181 stored in the storage section 104 is stored as the second process setting information 182 in the storage section 104. The present aspect eliminates the need to make a new setting in accordance with which the second image reader 302 carries out a process when the setting in accordance with which the second image reader 302 carries out a process is caused to coincide with the setting in accordance with which the first image reader 301 carries out a process. The present aspect can therefore provide a management apparatus (100) capable of efficiently make settings in accordance with which the plurality of image readers 300 carry out processes.

Eighth Aspect:

An image reading system SY1 according to an aspect of the present technology includes the plurality of image readers 300 including the first image reader 301 and the second image reader 302, the management apparatus (100), which realizes transmission of the scanned data SC1 generated by each of the plurality of image readers 300 in accordance with the address information 150 associated with the image reader 300 out of the plurality of pieces of address information 150, and the information processing apparatus 200 capable of transmitting a registration instruction 240 for storage of the plurality of pieces of address information 150 to the management apparatus (100). The management apparatus (100) includes the storage section 104, which stores the plurality of pieces of address information 150 including the first address information 151 associated with the first image reader 301 and the second address information 152 associated with the second image reader 302. The information processing apparatus 200 can transmit the duplication instruction 250 for duplication of the first address information 151 as the second address information 152 to the management apparatus (100). The management apparatus (100) further includes the receiver (105), which can receive the duplication instruction 250, and the setting section 111, which causes the storage section 104 to store the first address information 151 stored in the storage section 104 as the second address information 152 in accordance with the duplication instruction 250.

The present aspect can provide an image reading system SY1 capable of efficiently setting the destinations of the scanned data SC1 transmitted from the plurality of image readers 300.

Furthermore, the present technology is applicable, for example, to a management method, a method for controlling the management apparatus (100), a method for controlling the image reading system SY1, a program for controlling the management apparatus (100), a program for controlling the image reading system SY1, and a computer readable medium on which any of the control programs described above is recorded, which each realize transmission of the scanned data SC1 generated by the image readers 300 in accordance with the address information 150. Any of the apparatuses described above may be formed of a plurality of separate portions.

(2) Specific Example of Image Reading System Including Management Apparatus:

FIG. 1 diagrammatically shows the image reading system SY1 along with the cloud storages 400 as a specific example. The image reading system SY1 shown in FIG. 1 includes the cloud server 100 as an example of the management apparatus, the information processing apparatus 200, and the plurality of image readers 300. The plurality of cloud storages 400 are connected to the image reading system SY1 via a network NE1. The network NE1 is a wide area network including the Internet. In the image reading system SY1 shown in FIG. 1, the information processing apparatus 200 and the plurality of image readers 300 are connected to the network NE1 via a LAN 390. LAN is an abbreviation for Local Area Network. The LAN 390 may be a wired or wireless network. The plurality of image readers 300 include the first image reader 301, the second image reader 302, a third image reader 303, . . . . When the term "image reader 300" is used, it is assumed that the image reader 300 means any of the first image reader 301, the second image reader 302, the third image reader 303, The plurality of cloud storages 400 include a first cloud storage 401, a second cloud storage 402, a third cloud storage 403, . . . . When the term "cloud storage 400" is used, it is assumed that the cloud storage 400 means any of the first cloud storage 401, the second cloud storage 402, the third cloud storage 403, . . . .

The information processing apparatus 200 and the plurality of image readers 300 may be connected to the wide area network NE1 via no LAN 390.

The cloud server 100 is a server computer that manages the image readers 300 in the cloud. The cloud server 100 shown in FIG. 1 includes the storage section 104, the network I/F 105, the setting section 111, the connection processing section 112, the authentication section 113, and the output processing section 114. Although will be described later in detail, the setting section 111, the connection processing section 112, the authentication section 113, and the output processing section 114 are realized in the cloud server 100 through execution of a management program PR1 shown in FIG. 2. The storage section 104 stores the plurality of pieces of address information 150, the plurality of pieces of connection information 170, and other pieces of information. The storage section 104 may store the plurality of pieces of process setting information 180. The plurality of pieces of address information 150 may contain the first address information 151, the second address information 152, third address information 153, When the term "address information 150" is used, it is assumed that the address information 150 means any of the first address information 151, the second address information 152, the third address information 153, . . . . The plurality of pieces of connection information 170 include first connection information necessary for connection to the first cloud storage 401, second connection information necessary for connection to the second cloud storage 402, third connection information necessary for connection to the third cloud storage 403, . . . . When the term "connection information 170" is used, it is assumed that the connection information 170 means any of the first connection information, the second connection information, the third connection information, . . . . The plurality of pieces of process setting information 180 include the first process setting information 181, the second process setting information 182, third process setting information 183, . . . . When the term "process setting information 180" is used, it is assumed that the process setting information 180 means any of the first process setting information 181, the second process setting information 182, the third process setting information 183, . . . . The network I/F 105 is connected to the network NE1. In response to an instruction from the information processing apparatus 200, the cloud server 100 controls the transmission of the scanned data SC1 generated by the image readers 300 in accordance with the address information 150. When the address information 150 indicates that the cloud storage 400 is the transmission destination, the cloud server 100 transmits the scanned data SC1 to the cloud storage 400.

The information processing apparatus 200 is a terminal that is directly operated by the user in the image reading system SY1. The information processing apparatus 200 shown in FIG. 1 can transmit the following information to the cloud server 100: the registration instruction 240 for storage of the plurality of pieces of address information 150; the duplication instruction 250 for duplication of the first address information 151 as the second address information 152; and the acquisition request 260 for acquisition of the address information 150. The information processing apparatus 200 includes a storage apparatus 204, which can store the plurality of pieces of address information 150 and the plurality of pieces of process setting information 180 acquired from the cloud server 100. The information processing apparatus 200 can transmit to the cloud server 100 an instruction of transmission of the scanned data SC1 generated by the image reader 300 to the transmission destination.

The image reader 300 is an instrument that the user uses to read a document in the image reading system SY1. The image reader 300 shown in FIG. 1 can generate the scanned data SC1 by reading a document and transmit the scanned data SC1 to a transmission destination via the cloud server 100. The image reader 300 includes a storage apparatus 314, which stores the address information 150 and the process setting information 180. The storage apparatus 314 of the first image reader 301 stores the first address information 151 and the first process setting information 181. The storage apparatus 314 of the second image reader 302 stores the second address information 152 and the second process setting information 182. The storage apparatus 314 of the third image reader 303 stores the third address information 153 and the third process setting information 183.

The cloud storage 400 is a server computer that provides the user with a storage rental service. The cloud storage 400 shown in FIG. 1 receives and stores the scanned data SC1.

FIG. 2 diagrammatically shows the configuration of the cloud server 100 by way of example. The cloud server 100 includes a CPU 101, which is a processor, a ROM 102, which is a semiconductor memory, a RAM 103, which is a semiconductor memory, the storage section 104, the network I/F 105, and other components. The CPU is an abbreviation for Central Processing Unit, the ROM is an abbreviation for Read Only Memory, and the RAM is an abbreviation for Random Access Memory. The network I/F 105 is an example of a receiver capable of receiving the registration instruction 240, the duplication instruction 250, and the acquisition request 260. Information can be inputted to and outputted from the CPU 101, the ROM 102, the RAM 103, the storage section 104, the network I/F 105, and other components, which are electrically connected to each other. The storage section 104 can, for example, be a magnetic storage apparatus such as a hard disk drive, or a nonvolatile semiconductor memory such as a flash memory.

The storage section 104 stores the management program PR1, user information 140, the plurality of pieces of address information 150, the plurality of pieces of connection information 170, and other pieces of information. The storage section 104 is a computer readable medium on which the management program PR1 has been recorded. The management program PR1 may be recorded on an external computer readable storage medium. The storage section 104 may store the plurality of pieces of process setting information 180.

The CPU 101 causes the cloud server 100 to perform a plurality of functions of managing the plurality of image readers 300 by executing the management program PR1 read from the storage section 104 to the RAM 103. The functions include a setting function FU1 corresponding to the setting section 111, a connection processing function FU2 corresponding to the connection processing section 112, an authentication function FU3 corresponding to the authentication section 113, and an output processing function FU4 corresponding to the output processing section 114. The setting function FU1 causes the storage section 104 to store the first address information 151 stored in the storage section 104 as the second address information 152 in accordance with the duplication instruction 250. The connection processing section 112 is authenticated by the cloud storage 400 based on the connection information 170 to forward the scanned data SC1 generated by the image reader 300 to the cloud storage 400. The authentication section 113 requests the information processing apparatus 200 to authenticate the user when the network I/F 105 receives the duplication instruction 250 from the information processing apparatus 200. The output processing function FU4 forwards the requested address information 150 to the information processing apparatus 200 when the network I/F 105 receives the acquisition request 260.

The user information 140 is information for authentication of users who handle the plurality of image readers 300. The user information 140 shown in FIG. 2 includes a user identifier, which is abbreviated for ID, and a password.

The address information 150 is information representing the destination of the transmission of the scanned data SC1. For example, the first address information 151 associated with the first image reader 301 contains information representing the first cloud storage 401, the second cloud storage 402, the third cloud storage 403, . . . as the transmission destinations. The pieces of information described above are examples of the plurality of cloud storage address information 160 representing that the plurality of cloud storages 400 connected to the cloud server 100 are the transmission destinations. The address information 150 may include at least one piece of information other than the cloud storage address information 160, for example, an email address, a URL representing a location where data can be stored, a facsimile address, an external memory, a web conference system, an SNS, a folder in the information processing apparatus 200, and a web service. URL is an abbreviation for Uniform Resource Locator, and SNS is an abbreviation for Social Networking Service.

In FIG. 2, the reason why the second address information 152 and the third address information 153 are shown as blanks is that storage areas where the second address information 152 and the third address information 153 are stored are provided in the storage section 104, but no information representing the transmission destination is stored in each of the storage areas. Of course, the second address information 152 stored in the storage section 104 is the address information 150 associated with the second image reader 302, and the third address information 153 stored in the storage section 104 is the address information 150 associated with the third image reader 303.

The plurality of pieces of connection information 170 are the information necessary for connection of the cloud server 100 to the plurality of cloud storages 400, and are stored separately from the plurality of pieces of address information 150 in the storage section 104. The connection information 170 contains information for authentication performed by the cloud storage 400 with which the connection information 170 is associated. The connection information 170 shown in FIG. 2 contains, for example, an identifier "id" of the cloud server 100 as seen from the cloud storage 400, a password "pass" associated with the identifier "id", and a token "token" including an access token and a refresh token. The plurality of pieces of connection information 170 include, of course, the first connection information for the first cloud storage 401, the second connection information for the second cloud storage 402, the third connection information for the third cloud storage 403, . . . .

The process setting information 180 is information representing a setting in accordance with which the image reader 300 carries out a process. The information contains a scanning setting, a printing setting in a case where the image reader 300 has a printing function, and an electronic-instrument apparatus setting.

The scanning setting includes, for example, at least one of the following factors: whether the image to be read is a color image or a monochrome image; the resolution of the image to be read; whether the document is oriented horizontally or vertically; the file format of the output image; the sheet size such as the size A3 or A4; the paper type of the document such as plain paper or photo paper; and a read image trimming setting.

The printing setting includes, for example, at least one of the following factors: the sheet size such as the size A3 or A4, the paper type such as plain paper or photo paper; whether or not to perform borderless printing; the amount of overflow of the borders in the borderless printing; trimming of the output image; printing quality such as "vivid", "fine", or "standard"; whether or not to display the date; the density of lines in coloring printing; the number of lines in coloring printing; disc label printing density adjustment; disc label printing position adjustment; disc label outer and inner diameter adjustment; sticker printing position adjustment; a rubbing reduction setting; an operation noise reduction setting; the drying waiting period in double-sided printing; whether or not to perform bi-directional printing; and the printing density.

The electronic-instrument apparatus setting includes a facsimile setting when the image reader 300 has a printing function. The facsimile setting includes, for example, at least one of the following factors: the communication mode; an error correction setting; a dial tone detection setting; the dial type; a number display support setting; a connection line setting; a caller setting; the reception mode; a remote reception setting; whether or not to reject incoming calls or facsimile reception; a paper declaration setting at reception; the file format in saving or forwarding operation; the call count; and the telephone call count. The electronic-instrument apparatus settings further include, for example, at least one of the following factors: the volume; the screen brightness; an automatic power-on setting; an automatic power-off setting; the sleep transition period; the display language; the background color of the operation panel; the brightness of the light emitting diode for the ejected paper tray; a power saving setting; a sheet setting error notification setting; a network setting; the setting of the connection between the image reader 300 and the cloud server 100, a security setting; and a report setting.

Figure 3:
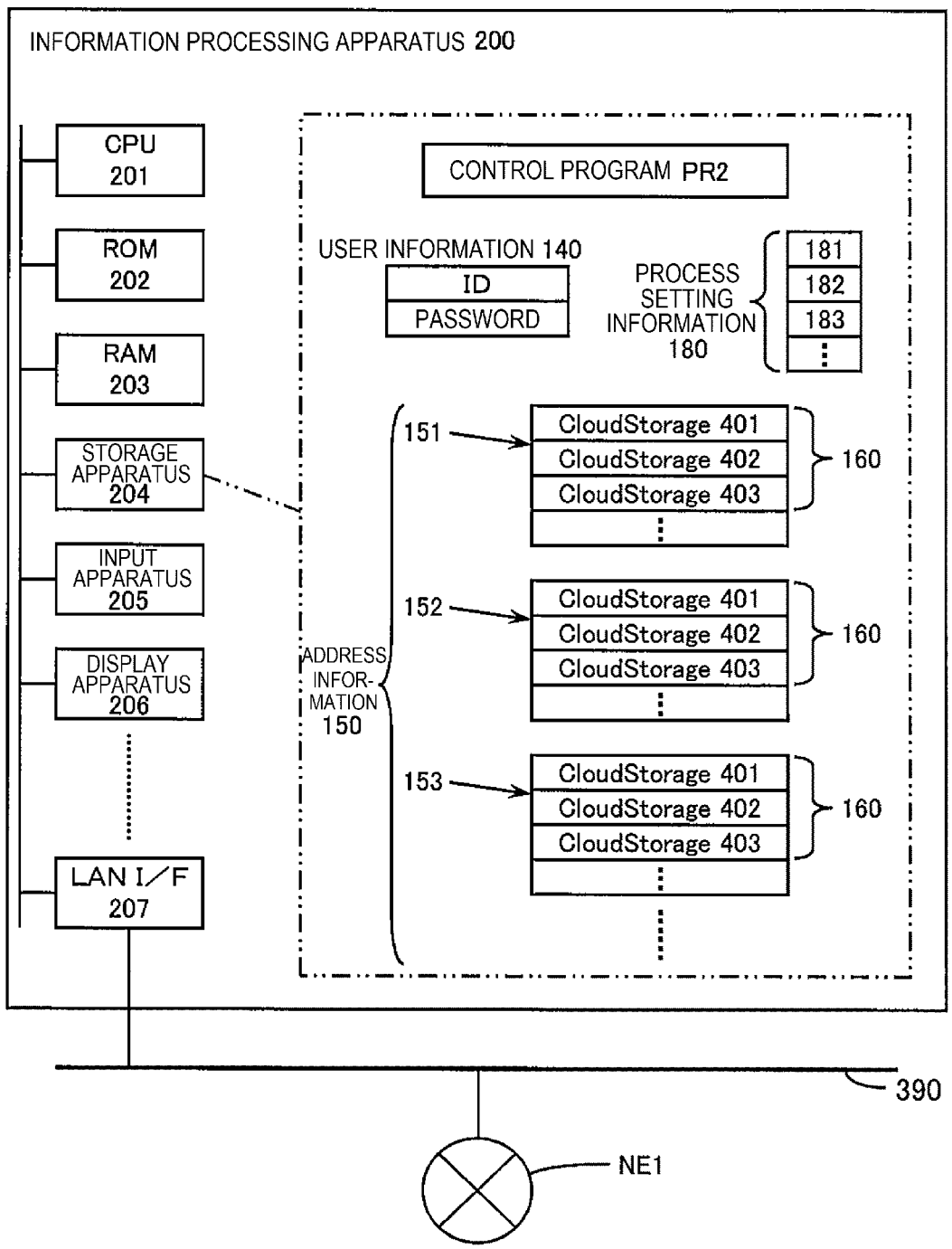
FIG. 3 is a block diagram diagrammatically showing an example of the configuration of an information processing apparatus.

FIG. 3 diagrammatically shows the configuration of the information processing apparatus 200 by way of example. The information processing apparatus 200 includes a CPU 201, which is a processor, a ROM 202, which is a semiconductor memory, a RAM 203, which is a semiconductor memory, the storage apparatus 204, an input apparatus 205, a display apparatus 206, a LAN I/F 207, and other components. Information can be inputted to and outputted from the CPU 201, the ROM 202, the RAM 203, the storage apparatus 204, the input apparatus 205, the display apparatus 206, the LAN I/F 207, and other components, which are electrically connected to each other. The storage apparatus 204 can, for example, be a magnetic storage apparatus such as a hard disk drive, or a nonvolatile semiconductor memory such as a flash memory. The input apparatus 205 can, for example, be a pointing device, hard keys including a keyboard, or a touch panel attached to the surface of the display panel. The display apparatus 206 can, for example, be a liquid crystal display panel. The LAN I/F 207 is connected to the LAN 390.

The storage apparatus 204 stores a control program PR2 and other pieces of information. The storage apparatus 204 is a computer readable medium on which the control program PR2 has been recorded. The control program PR2 may be recorded on an external computer readable storage medium. The storage apparatus 204 may store the user information 140, the plurality of pieces of address information 150, and the plurality of pieces of process setting information 180.

The CPU 201 causes the information processing apparatus 200 to realize a plurality of functions as the information processing apparatus 200, which forms the image reading system SY1, by executing the control program PR2 read from storage apparatus 204 to the RAM 203. The functions described above include the function of issuing the registration instruction 240, the duplication instruction 250, and the acquisition request 260 to the cloud server 100, the function of acquiring the plurality of pieces of address information 150 from the cloud server 100, and other functions.

Figure 4:
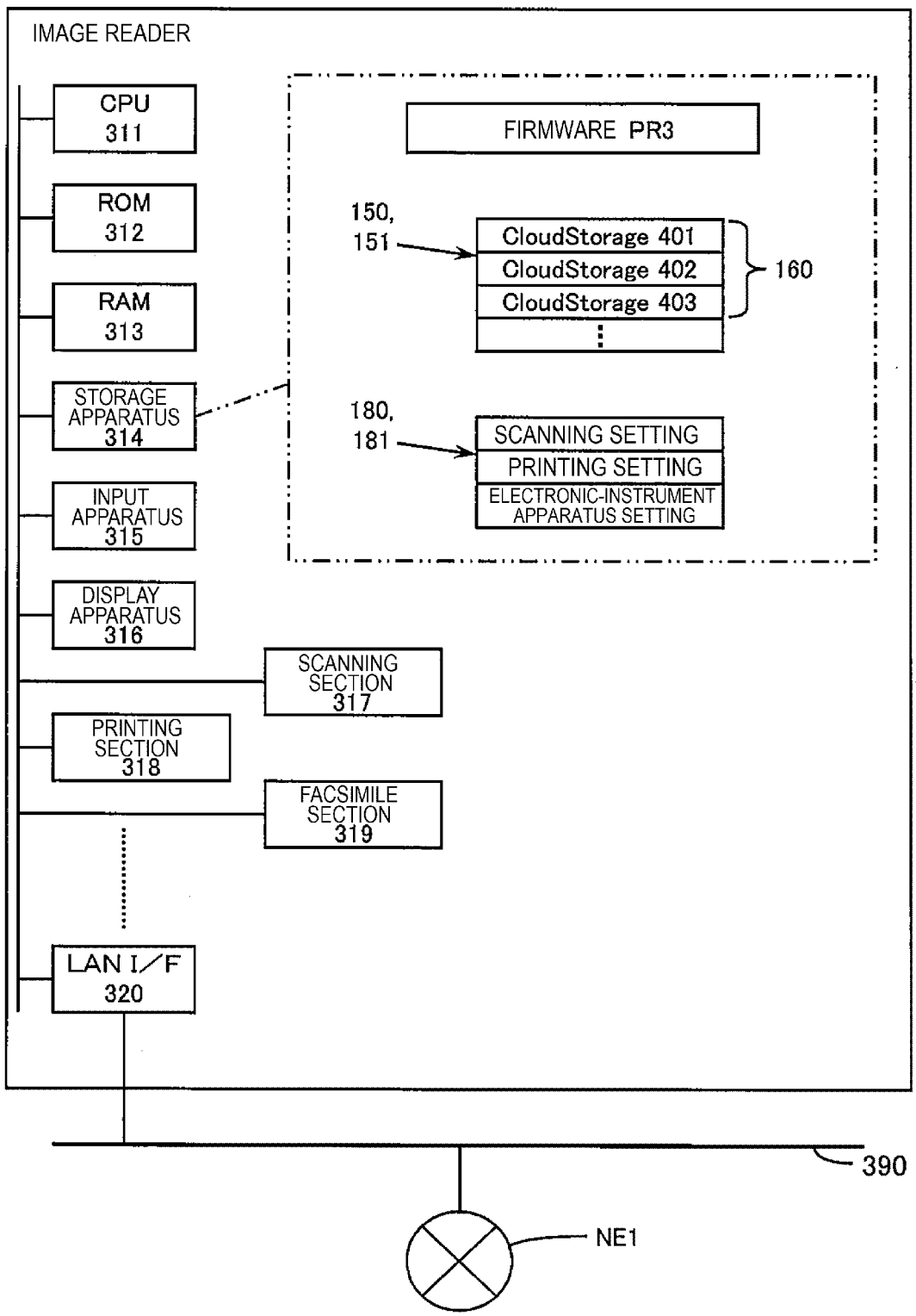
FIG. 4 is a block diagram diagrammatically showing an example of the configuration of an image reader.

FIG. 4 diagrammatically shows the configuration of a multifunction machine having printing and facsimile functions as an example of the image reader 300. The image reader 300 includes a CPU 311, which is a processor, a ROM 312, which is a semiconductor memory, a RAM 313, which is a semiconductor memory, the storage apparatus 314, an input apparatus 315, a display apparatus 316, a scanning section 317, a printing section 318, a facsimile section 319, a LAN I/F 320, and other components. Information can be inputted to and outputted from the CPU 311, the ROM 312, the RAM 313, the storage apparatus 314, the input apparatus 315, the display apparatus 316, the scanning section 317, the printing section 318, the facsimile section 319, the LAN I/F 320, and other components, which are electrically connected to each other. The storage apparatus 314 can, for example, be a nonvolatile semiconductor memory such as a flash memory or a magnetic storage apparatus such as a hard disk drive. The input apparatus 315 can, for example, be a touch panel attached to the surface of the display panel, or hard keys. The display apparatus 316 can, for example, be a liquid crystal display panel. The scanning section 317 reads a document and generates the scanned data SC1 representing the read image. The printing section 318 performs printing on a printing sheet. The image reader 300 performs a copy function by reading a document via the scanning section 317 and printing the read image via the printing section 318. The facsimile section 319 facsimiles an image read by the scanning section 317 to a transmission destination via a telephone line, or receives an image facsimiled from a transmission source via the telephone line. The image reader 300 can print via the printing section 318 an image received by the facsimile section 319. The LAN I/F 320 is connected to the LAN 390.

The storage apparatus 314 stores firmware PR3, the address information 150, and the process setting information 180. For example, when the image reader 300 is the first image reader 301, the first address information 151 and the first process setting information 181 are stored in the storage apparatus 314 in addition to the firmware PR3.

The CPU 311 causes the image reader 300 to perform a plurality of functions as the image reader 300 by executing the firmware PR3 read from the storage apparatus 314 to the RAM 313. The functions include the scanning, printing, facsimile, and other functions. The scanning function includes the function of transmitting the scanned data SC1 generated by reading a document to an external apparatus.

Figure 5:
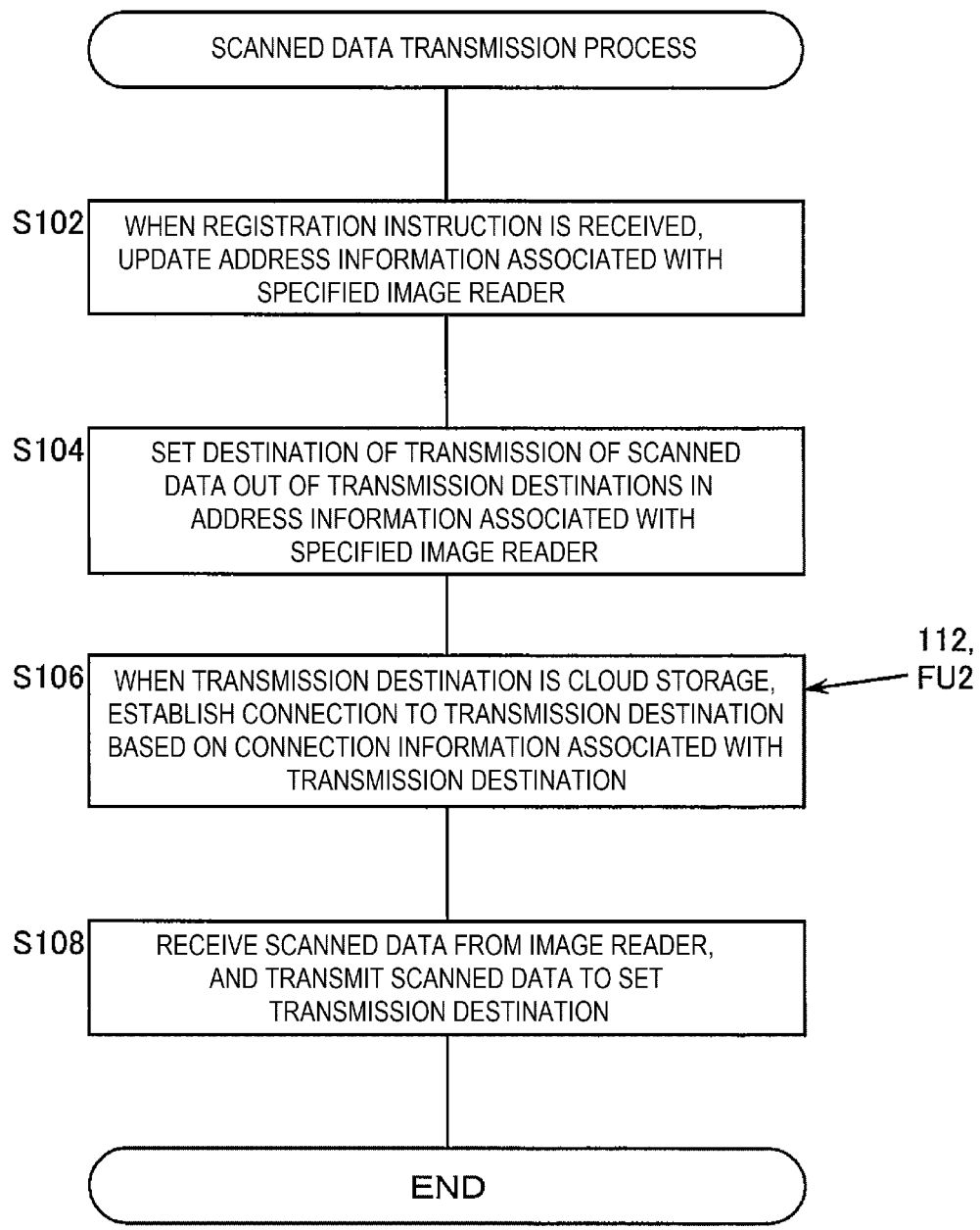
FIG. 5 is a flowchart diagrammatically showing an example of a scanned data transmission process carried out by the management apparatus.

(3) Specific Example of Processes Carried Out by Image Reading System:

FIG. 5 diagrammatically shows by way of example the scanned data transmission process from the setting of the transmission information 150 to the transmission of the scanned data SC1 to a transmission destination. The scanned data transmission process is carried out by the cloud server 100 and starts when the registration instruction 240 or a transmission destination selection instruction is transmitted from the information processing apparatus 200 to the cloud server 100. Note that step S106 corresponds to the connection processing section 112 and the connection processing function FU2. In the following description, the term "step" is omitted, and the reference character of the step is shown in parentheses.

When the destination of the transmission of the scanned data SC1 generated by the image reader 300 is not registered in the cloud server 100, the user needs to operate the information processing apparatus 200 to store the address information 150 in the cloud server 100. When the user instructs the information processing apparatus 200 to start the operation described above, the information processing apparatus 200 having accepted the instruction causes the display section 206 to display a registration screen that is not shown but accepts input of specification of an image reader 300 and information on the transmission destination. When the user specifies an image reader 300 on the registration screen and inputs the information representing a transmission destination thereto, the information processing apparatus 200 accepts the specification of an image reader 300 and the input of the information representing a transmission destination, and transmits information representing the image reader 300 and the transmission destination along with the registration instruction 240 to the cloud server 100. Thereafter, when the network I/F 105 receives the registration instruction 240, the cloud server 100 updates the address information 150 associated with the specified image reader 300 (S102).

For example, when the transmission destination of the scanned data SC11 from the first image reader 301 is the cloud storage 400, the user only needs to specify the first image reader 301 on the registration screen and input information representing the cloud storage 400 thereto. The information processing apparatus 200 having accepted the specification and input operation described above transmits the information representing the first image reader 301 and the cloud storage 400 along with the registration instruction 240 to the cloud server 100. When the user specifies the first image reader 301 and inputs information representing the first cloud storage 401, the second cloud storage 402, and the third cloud storage 403 to the registration screen, information representing the first image reader 301, and the first cloud storage 401, the second cloud storage 402, and the third cloud storage 403 is transmitted along with the registration instructions 240 from the information processing apparatus 200 to the cloud server 100. In this case, the cloud server 100 causes the storage section 104 to store the information representing the first cloud storage 401, the second cloud storage 402, and the third cloud storage 403 as the first address information 151 associated with the first image reader 301. The first address information 151 does not, of course, contain the connection information 170 for authentication performed by the cloud storage 400.

When the destination of the transmission of the scanned data SC1 is registered in the cloud server 100, the process in S102 does not need to be carried out.

Since the address information 150 can contain information representing a plurality of transmission destinations, the user needs to set the destination of the transmission of the scanned data SC1 from one or more transmission destinations registered in the cloud server 100. When the user instructs the information processing apparatus 200 to start the setting operation described above, the information processing apparatus 200 having accepted the instruction causes the display section 206 to display a selection screen that is not shown but accepts the specification of the image reader 300 and the selection of the transmission destination. When the user specifies an image reader 300 on the selection screen, the information processing apparatus 200 acquires the address information 150 associated with the specified image reader 300 from the cloud server 100 and displays the acquired address information 150 on the selection screen. When the user selects a transmission destination from the address information 150 on the selection screen, the information processing apparatus 200 accepts the selection of a transmission destination and transmits information representing the specified image reader 300 and information representing the selected transmission destination along with a setting instruction to the cloud server 100. Thereafter, when the network I/F 105 receives the setting instruction, the cloud server 100 sets the destination of the transmission of the scanned data SC1 out of the transmission destinations in the address information 150 associated with the specified image reader 300 (S104).

For example, when the user desires to set the first cloud storage 401 as the destination of the transmission of the scanned data SC11 from the first image reader 301, the user only needs to specify the first image reader 301 and select the first cloud storage 401 on the selection screen. The information processing apparatus 200 having accepted the specification and selection operation transmits information representing the first image reader 301 and the first cloud storage 401 along with the setting instruction to the cloud server 100. In this case, the cloud server 100 sets the first cloud storage 401 associated with the first image reader 301 as the destination of the transmission of the scanned data SC11.

When the destination of the transmission of the scanned data SC1 generated by the image reader 300 is the cloud storage 400, the cloud server 100 needs to establish connection to the cloud storage 400. To this end, the cloud server 100 acquires the connection information 170 for establishment of the connection to the cloud storage 400, and establishes the connection to the cloud storage 400 based on the connection information 170 associated with the cloud storage 400 (S106). The connection information 170 contains the identifier "id", the password "pass", the token "token", and other pieces of information, as shown in FIG. 2. When the cloud server 100 is first authenticated by the cloud storage 400, the cloud server 100 acquires the identifier "id" and the password "pass", causes the storage section 104 to store the acquired information, acquires the token "token", which maintains the cloud server 100 authenticated, from the cloud storage 400, and causes the storage section 104 to store the acquired information. Afterward, the cloud server 100 can establish the connection to the cloud storage 400 by using the token "token" contained in the connection information 170. The cloud server 100 can further acquire a new token "token" from the cloud storage 400 within the period for which the token "token" is valid and store the newly acquired token in the connection information 170 to maintain the cloud storage 400 authenticated for a long period.

The plurality of pieces of connection information 170 include the first connection information for the first cloud storage 401, the second connection information for the second cloud storage 402, the third connection information for the third cloud storage 403, . . . . For example, when the scanned data SC11 from the first image reader 301 is transmitted to the first cloud storage 401, the cloud server 100 can establish connection to the first cloud storage 401 by using the token "token" contained in the first connection information for the first cloud storage 401.

The cloud server 100 then receives the scanned data SC1 from the specified image reader 300, transmits the scanned data SC1 to the set transmission destination (S108), and terminates the scanned data transmission process. After receiving all the scanned data SC1 from the image reader 300, the cloud server 100 may transmit the scanned data SC1 to the transmission destination. Instead, the cloud server 100 may repeat receiving a portion of the scanned data SC1 from the image reader 300 and transmitting the portion of the scanned data SC1 to the transmission destination.

For example, when the first image reader 301 is instructed to transmit the scanned data SC11 to the first cloud storage 401, the connection from the cloud server 100 to the first cloud storage 401 is established in S106. Thereafter, in S108, the cloud server 100 receives the scanned data SC11 from the first image reader 301 and transmits the scanned data SC11 to the first cloud storage 401.

In the scanned data transmission process described above, the cloud server 100 transmits the scanned data SC1 generated by the image reader 300 in accordance with the address information 150 associated with the image reader 300 out of the plurality of pieces of address information 150.

When the user manages a plurality of image readers 300, it may take time to register the plurality of transmission destinations with respect to the image readers 300, or registration omission may occur. To avoid the problems described above, in the present specific example, when the destination of the transmission of the scanned data SC1 generated by an image reader 300 is caused to coincide with the destination of the transmission of the scanned data SC1 generated by another image reader 300, the cloud server 100 is configured to duplicate the address information 150 in response to the duplication instruction 250. The configuration described above eliminates the need for re-setting the destination of the scanned data SC1 transmitted from the second and subsequent image readers 300, and the destination of the transmission of the scanned data SC1 is efficiently set for the plurality of image readers 300.

It is assumed in the following description that, out of the plurality of image readers 300, an image reader in which the destination of the transmission of the scanned data SC1 is registered is assigned to the first image reader 301, and an image reader in which the destination of the transmission of the scanned data SC1 to is not registered is assigned to the second image reader 302.

FIG. 6 diagrammatically shows the address information duplication process carried out by the cloud server 100 by way of example. The address information duplication process starts when the duplication instruction 250 is transmitted from the information processing apparatus 200 to the cloud server 100. Step S202 corresponds to the authentication section 113 and the authentication function FU3. Steps S204 to S218 correspond to the setting section 111 and the setting function FU1.

When the user specifies the first image reader 301, which is the duplication source instrument, and the second image reader 302, which is the duplication destination instrument, and instructs the information processing apparatus 200 to duplicate the address information 150, the information processing apparatus 200 transmits information representing the first image reader 301 and the second image reader 302 along with duplication instruction 250 to the cloud server 100. The cloud server 100 having received the duplication instruction 250 from the information processing apparatus 200 starts the address information duplication process.

When the address information duplication process starts, the cloud server 100 requests the information processing apparatus 200 having received the duplication instruction 250 to authenticate the user, and when the user is authenticated, the cloud server 100 proceeds to the process in S204 (S202). For example, the cloud server 100 can cause the information processing apparatus 200 having received the duplication instruction 250 to display a screen that accepts input of an ID and a password, and evaluate whether or not the user is authenticated based on the ID and the password inputted via the screen. When the ID and the password inputted via the screen coincide with the ID and the password contained in the user information 140 stored in the storage section 104, the cloud server 100 assumes that the user is authenticated and can proceed to the process in S204. When the ID and the password inputted via the screen do not coincide with the ID and the password contained in the user information 140 stored in the storage section 104, the cloud server 100 may cause the information processing apparatus 200 to display a screen showing an error and terminate the address information duplication process.

As described above, the cloud server 100 is secure enough because the first address information 151 is not duplicated even when an unauthorized user transmits the duplication instruction 250 to the cloud server 100. When the cloud server 100 receives the duplication instruction 250 and does not need to request the information processing apparatus 200 to authenticate the user, the process in S202 can, of course, be omitted.

After the authentication process in S202, the cloud server 100 splits the process in accordance with whether or not the first image reader 301, which is the duplication source instrument, and the second image reader 302, which is the duplication destination instrument, differ from each other (S204). When the duplication source instrument coincides with the duplication destination instrument, the second image reader 302, which is the duplication destination instrument, has not been specified. In this case, the cloud server 100 proceeds to the process in S218, causes the information processing apparatus 200 to display a screen showing an error, and terminates the address information duplication process.

When the duplication source instrument differs from the duplication destination instrument, the cloud server 100 splits the process in accordance with whether or not the first image reader 301, which is the duplication source instrument, and the second image reader 302, which is the duplication destination instrument, have been registered in the cloud server 100 (S206). When the duplication source instrument has not been registered, the first address information 151 has not been stored in the storage section 104, and when the duplication destination instrument has not been registered, the area where the second address information 152 is stored has not been provided in the storage section 104. In these cases, the cloud server 100 proceeds to the process in S218, causes the information processing apparatus 200 to display the screen showing an error, and terminates the address information duplication process.

When the duplication source instrument and the duplication destination instrument both have been registered, the cloud server 100 splits the process in accordance with whether or not the first image reader 301, which is the duplication source instrument, and the second image reader 302, which is the duplication destination instrument, both support the scanning function (S208). Some of the image readers 300 include printers having no scanning function. When the duplication source instrument has no scanning function, the first address information 151 has not been stored in the storage section 104, and when the duplication destination instrument has no scanning function, the second address information 152 is not used. In these cases, the cloud server 100 proceeds to the process in S218, causes the information processing apparatus 200 to display the screen showing an error, and terminates the address information duplication process.

When the duplication source instrument and the duplication destination instrument both support the scanning function, the cloud server 100 splits the process in accordance with whether or not the second image reader 302, which is the duplication destination instrument, is an instrument that supports the destination of the transmission performed by the first image reader 301, which is the duplication source instrument (S210). For example, depending on the cloud storage 400, an image reader 300 manufactured in a certain country may be permitted to use the cloud storage 400, whereas an image reader 300 manufactured in another country may not be permitted to use the cloud storage 400. In this case, the duplication destination instrument is in some cases an instrument that does not support the destination of the transmission performed by the duplication source instrument. When the duplication destination instrument is an instrument that does not support the destination of the transmission performed by the duplication source instrument, the cloud server 100 proceeds to the process in S218, causes the information processing apparatus 200 to display the screen showing an error, and terminates the address information duplication process.

When the duplication destination instrument supports the destination of the transmission performed by the duplication source instrument, and the second address information 152, which is the address information 150 on the address of the duplication destination, is stored in the storage section 104, the cloud server 100 deletes the second address information 152 from the storage section 104 (S212). As a result, the second address information 152 has been deleted from the area where the second address information 152 is stored in the storage section 104, as shown in FIG. 2. When the second address information 152 has been already stored in the storage section 104, and when the first address information 151 is added to the area where the second address information 152 is stored, a larger storage area is needed for the second address information 152. When the area where the second address information 152 is stored is a limited area, there occurs a conceivable situation in which the first address information 151 cannot be fully stored in the area where the second address information 152 is stored. Deleting the second address information 152 from the storage section 104 after the duplication instruction 250 is received with the second address information 152 stored in the storage section 104 allows efficient setting of the destination to which the plurality of image readers 300 transmit the scanned data SC1.

When the second address information 152 has not been stored in the storage section 104, the process in S212 can be omitted.

After the process in S212, the cloud server 100 acquires the first address information 151, which is the address information 150 on the address of the duplication source, from the storage section 104 (S214). The process in S214 can be the process of reading the first address information 151 from the storage section 104 to the RAM 103.

Figure 7:
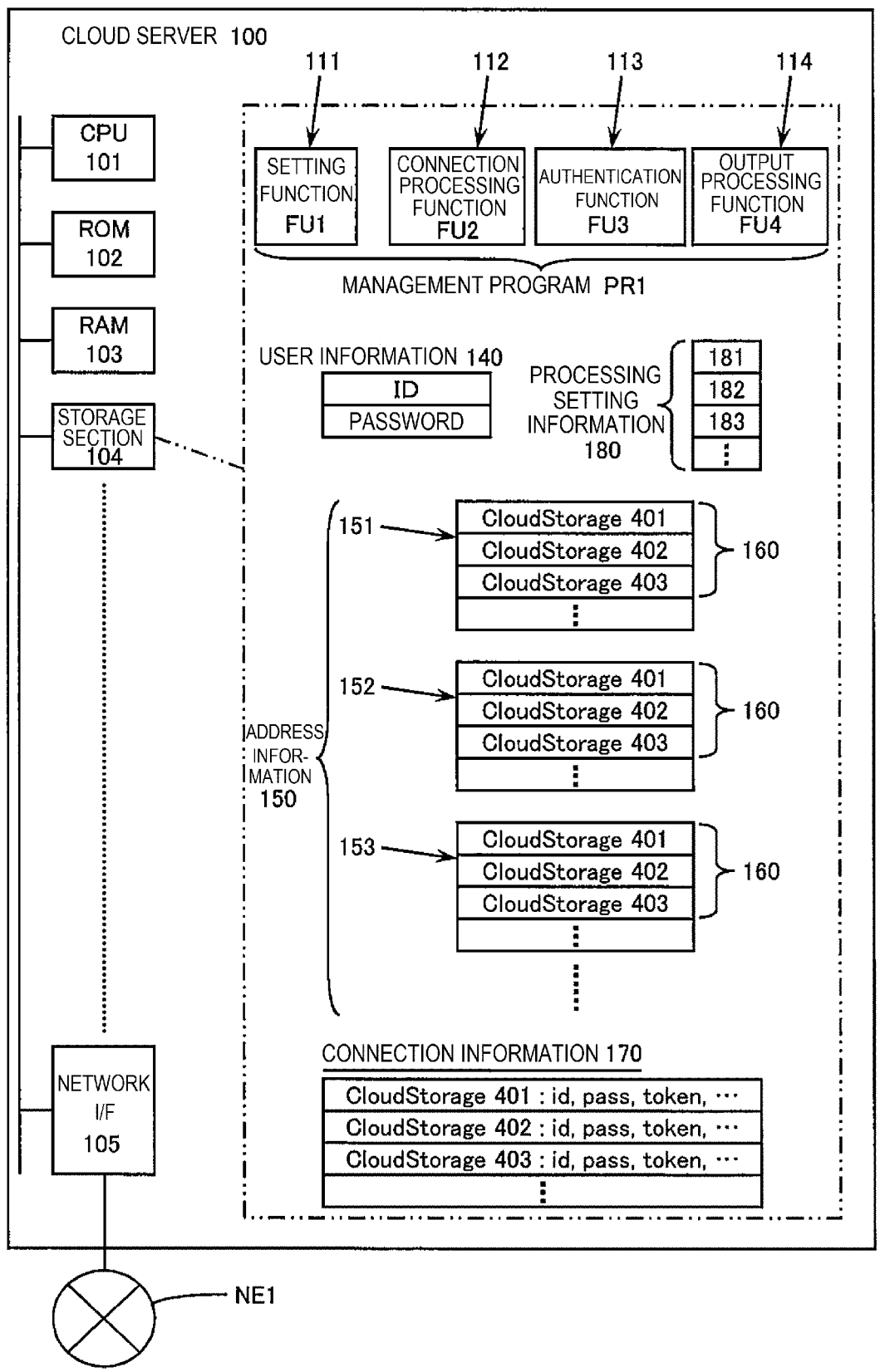
FIG. 7 diagrammatically shows by way of example that the address information is duplicated.

After the first address information 151 is acquired, the cloud server 100 copies the transmission destinations contained in the acquired first address information 151 one by one in the area where the second address information 152, which is the address information 150 on the address of the duplication destination, is stored (S216), and terminates the address information duplication process. When the process in S216 is carried out, the plurality of transmission destinations contained in the first address information 151 are stored in the storage section 104, specifically, in the area where the second address information 152 is stored, as shown in FIG. 7 by way of example. FIG. 7 diagrammatically shows by way of example that the first address information 151 is duplicated as the second address information 152 and the third address information 153 in the storage section 104.

In the address information duplication process described above, the cloud server 100 causes the storage section 104 to store the first address information 151 stored in the storage section 104 as the second address information 152 in accordance with the duplication instruction 250. Similarly, as for the area where the third address information 153 is stored, the first address information 151 stored in the storage section 104 is stored as the third address information 153 in the storage section 104, provided that the duplication destination instrument is replaced with the third image reader 303 and the address information 150 on the address of the duplication destination is replaced with the third address information 153 in the address information duplication process.

As described above, the first address information 151 stored in the storage section 104 is stored in the storage section 104 as the second address information 152 in accordance with the duplication instruction 250. Therefore, when the destination of transmission of the scanned data SC12 generated by the second image reader 302 is caused to coincide with the destination of transmission of the scanned data SC11 generated by the first image reader 301, it is no longer necessary to re-set the destination of the scanned data SC12 transmitted from the second image reader 302. The configuration described above reduces the length of time required to register a plurality of transmission destinations corresponding to the image readers 300, and use of the setting for the first one of the plurality of image readers 300 ensures correct settings for the second and subsequent image readers. The present specific example therefore allows efficient setting of the destinations of the scanned data SC1 transmitted from the plurality of image readers 300.

(4) Variations:

A variety of variations of the present disclosure are conceivable.

For example, the processes described above can be changed as appropriate. For example, the order of the processes can be changed. In the address information duplication process shown in FIG. 6, for example, the evaluation process in S210 can be carried out before either S206 or S208.

When the user can download the address information 150 registered in the cloud server 100 to the information processing apparatus 200, the user can use the address information 150 for other purposes, as shown in FIG. 8 by way of example. Conceivable uses of the address information 150 include, for example, using the address information 150 to set a favorite destination to which the image reader 300 transmits scanned data.

FIG. 8 diagrammatically shows an address information output process carried out by the cloud server 100 by way of example. The address information output process starts when the acquisition request 260 to acquire the address information 150 is transmitted from the information processing apparatus 200 to the cloud server 100. The address information output process corresponds to the output processing section 114 and the output processing function FU4.

When the user specify any of the plurality of image readers 300 and instructs the information processing apparatus 200 to acquire the address information 150, the information processing apparatus 200 transmits information representing the specified image reader 300 along with the acquisition request 260 to acquire the address information 150 to the cloud server 100. The cloud server 100 having received the acquisition request 260 from the information processing apparatus 200 starts the address information output process.

When the address information output process starts, the cloud server 100 requests the information processing apparatus 200 having received the acquisition request 260 to authenticate the user, and when the user is authenticated, the cloud server 100 proceeds to the process in S304 (S302). The authentication process in S302 may be the same as the authentication process in S202 shown in FIG. 6. When the cloud server 100 receives the acquisition request 260 and does not need to request the information processing apparatus 200 to authenticate the user, the process in S302 can, of course, be omitted.

After the authentication process in S302, the cloud server 100 splits the process in accordance with whether or not the image reader 300 that is the specified instrument has been registered in the cloud server 100 (S304). When the specified instrument has not been registered, the address information 150 has not been stored in the storage section 104. In this case, the cloud server 100 proceeds to the process in S312, causes the information processing apparatus 200 to display a screen showing an error, and terminates the address information output process.

When the specified instrument has been registered, the cloud server 100 splits the process in accordance with whether or not the image reader 300 that is the specified instrument supports the scanning function (S306). When the specified instrument has no scanning function, the address information 150 has not been stored in the storage section 104. In this case, the cloud server 100 proceeds to the process in S312, causes the information processing apparatus 200 to display the screen showing an error, and terminates the address information output process.

When the specified instrument supports the scanning function, the cloud server 100 acquires the requested address information 150, that is, the address information 150 associated with the image reader 300 that is the specified instrument from the storage section 104 (S308). The process in S308 can be the process of reading the requested address information 150 from the storage section 104 to the RAM 103.

After acquiring the address information 150, the cloud server 100 transmits the acquired address information 150 toward the information processing apparatus 200 via the network I/F 105 (S310), and terminates the address information output process. When the process in S310 is carried out, the information processing apparatus 200 having issued the acquisition request 260 to acquire the address information 150 to the cloud server 100 can acquire the requested address information 150 from the cloud server 100. FIG. 3 shows that the requested address information 150 has been stored in storage apparatus 204.

When the network I/F 105 receives the acquisition request 260 to acquire the address information 150 from the information processing apparatus 200 through the address information output process described above, the cloud server 100 forwards the requested address information 150 to the information processing apparatus 200.

The user who has downloaded the requested address information 150 to the information processing apparatus 200 can use the address information 150 for other purposes, such as using the address information 150 to set a favorite destination to which the image reader 300 transmits scanned data.

When the process setting information 180, which represents the setting in accordance with which the image reader 300 carries out a process, can also be duplicated, the settings in accordance with which the plurality of image readers 300 carry out processes can be efficiently set, as shown in FIG. 9 by way of example.

FIG. 9 diagrammatically shows an information duplication process carried out by the cloud server 100 by way of example. Unlike the address information duplication process shown in FIG. 6, in the information duplication process shown in FIGS. 9, S212, S214, and S216 are replaced with S402, S404, and S406, respectively.

When the user specifies the first image reader 301, which is the duplication source instrument, and the second image reader 302, which is the duplication destination instrument, and instructs the information processing apparatus 200 to duplicate the address information 150 and the process setting information 180, the information processing apparatus 200 transmits information representing the first image reader 301 and the second image reader 302 along with duplication instruction 250 to the cloud server 100. The cloud server 100 having received the duplication instruction 250 from the information processing apparatus 200 starts the information duplication process.

The cloud server 100 carries out the processes in S402 and the subsequent processes when the user authentication is accepted (S202), the duplication source instrument differs from the duplication destination instrument (S204), both the duplication source instrument and the duplication destination instrument have been registered (S206), both the duplication source instrument and the duplication destination instrument support the scanning function (S208), and the duplication destination instrument supports the destination of the transmission of the duplication source instrument (S210).

In S402, when the second address information 152, which is the address information 150 on the address of the duplication destination, and the second process setting information 182, which is the process setting information 180 on the process setting at the duplication destination, are stored in the storage section 104, the cloud server 100 deletes the second address information 152 and second process setting information 182 from the storage section 104. When the second process setting information 182 has been already stored in the storage section 104, and when the first process setting information 181 is added to the area where the second process setting information 182 is stored, a larger storage area is needed for the second process setting information 182. When the area where the second process setting information 182 is stored is a limited area, there conceivably occurs a situation in which the first process setting information 181 cannot be fully stored in the area where the second process setting information 182 is stored. Deleting the second process setting information 182 from the storage section 104 after the duplication instruction 250 is received with the second process setting information 182 stored in the storage section 104 allows a setting in accordance with which the plurality of image readers 300 carry out processes to be efficiently made.

When the second process setting information 182 has not been stored in the storage section 104, the process in S402 can be omitted.

After the process in S402, the cloud server 100 acquires the first address information 151, which is the address information 150 on the address of the duplication source, and the first process setting information 181, which is the process setting information 180 on the process setting at the duplication source, from the storage section 104 (S404). The process in S404 can be the process of reading the first address information 151 and the first process setting information 181 from the storage section 104 into the RAM 103.

After acquiring the first address information 151 and the first process setting information 181, the cloud server 100 copies the acquired first address information 151 to the area where the second address information 152, which is the address information 150 on the address of the duplication destination, is stored, copies the acquired first process setting information 181 to the area where the second process setting information 182, which is the process setting information 180 on the process setting at the duplication destination, is stored (S406), and terminates the information duplication process.

By the information duplication process described above, the cloud server 100 causes the storage section 104 to store the first address information 151 stored in the storage section 104 as the second address information 152 and causes the storage section 104 to store the first process setting information 181 stored in the storage section 104 as the second process setting information 182 in accordance with the duplication instruction 250.

As described above, the first process setting information 181 stored in the storage section 104 is stored in the storage section 104 as the second process setting information 182 in accordance with the duplication instruction 250. The configuration described above eliminates the need to make a new setting in accordance with which the second image reader 302 carries out a process when the setting in accordance with which the second image reader 302 carries out a process is caused to coincide with the setting in accordance with which the first image reader 301 carries out a process. The configuration described above reduces the length of time required to make the setting in accordance with which the image readers 300 each carry out a process, and use of the setting for the first one of the plurality of image readers 300 ensures correct settings for the second and subsequent image readers. The present specific example therefore allows settings in accordance with which the plurality of image readers 300 carry out processes to be efficiently made.

(5) Conclusions:

As described above, according to the present disclosure, the variety of aspects thereof can provide, for example, a technology for allowing efficient setting of the destinations of the scanned data SC1 transmitted from the plurality of image readers 300. The basic effects and advantages described above can, of course, be provided even when the technology consists only of the constituent requirements according to the independent claims.

It is also conceivable to employ a configuration in which the configurations disclosed in the examples described above are swapped or combined with each other, a configuration in which the configurations disclosed in known technologies and in the examples described above are swapped or combined with each other, and other configurations. The present disclosure encompasses these configurations and other configurations.

What is claimed is:

1. A management apparatus that realizes transmission of scanned data, which is generated by each of a plurality of image readers including a first image reader and a second image reader, in accordance with address information associated with the image reader, the management apparatus comprising:
   a storage that stores a plurality of pieces of address information including first address information associated with the first image reader and second address information associated with the second image reader;
   a receiver configured to receive a duplication instruction that duplicates the first address information as the second address information; and
   a setting section that causes the storage to store the first address information stored in the storage as the second address information in accordance with the duplication instruction.

2. The management apparatus according to claim 1,
wherein the first address information contains cloud storage address information representing that a cloud storage connected to the management apparatus is a transmission destination,
the storage stores connection information necessary for connection from the management apparatus to the cloud storage separately from the plurality of pieces of address information,
the setting section causes the storage to store the first address information that does not contain the connection information as the second address information in accordance with the duplication instruction, and
the management apparatus further comprises a connection processor that establishes the connection to the cloud storage based on the connection information to forward the scanned data from the second image reader to the cloud storage.

3. The management apparatus according to claim 1,
wherein the first address information contains a plurality of pieces of cloud storage address information representing that a plurality of cloud storages connected to the management apparatus are each a transmission destination, and
the setting section causes the storage to store the first address information containing the plurality of pieces of cloud storage address information as the second address information in accordance with the duplication instruction.

4. The management apparatus according to claim 1,
further comprising an authentication section that requests an information processing apparatus to authenticate a user when the receiver receives the duplication instruction from the information processing apparatus, and
wherein the setting section causes the storage to store the first address information stored in the storage as the second address information when the authentication is made.

5. The management apparatus according to claim 1, wherein after the duplication instruction is received with the second address information stored in the storage, the setting section deletes the second address information from the storage, and causes the storage to store the first address information as the second address information after deleting the second address information.

6. The management apparatus according to claim 1,
wherein the receiver is configured to receive from an information processing apparatus an acquisition request to acquire requested address information out of the plurality of pieces of address information stored in the storage, and
the management apparatus further comprises an output processor that forwards the requested address information to the information processing apparatus when the acquisition request is received.

7. The management apparatus according to claim 1,
wherein the storage stores first process setting information representing a setting in accordance with which the first image reader carries out a process, and second process setting information representing a setting in accordance with which the second image reader carries out a process, and
the setting section causes the storage to store the first process setting information stored in the storage as the second process setting information in accordance with the duplication instruction.

8. An image reading system comprising a plurality of image readers including a first image reader and a second image reader, a management apparatus that realizes transmission of scanned data, which is generated by each of the plurality of image readers, in accordance with address information associated with the image reader, and an information processing apparatus configured to transmit a registration instruction that instructs the management apparatus to store the plurality of pieces of address information,
wherein the management apparatus includes a storage that stores the plurality of pieces of address information, which includes first address information associated with the first image reader and second address information associated with the second image reader,
the information processing apparatus is configured to transmit a duplication instruction that duplicates the first address information as the second address information to the management apparatus, and
the management apparatus includes
a receiver configured to receive the duplication instruction, and
a setting section that causes the storage to store the first address information stored in the storage as the second address information in accordance with the duplication instruction.

* * * * *